US012679306B2

(12) United States Patent
Tsuzuki et al.

(10) Patent No.: US 12,679,306 B2
(45) Date of Patent: Jul. 14, 2026

(54) INFORMATION PROCESSING DEVICE, VEHICLE, TERMINAL, INFORMATION PROCESSING METHOD, AND RECORDING MEDIUM STORING INFORMATION PROCESSING PROGRAM

(71) Applicant: TOYOTA JIDOSHA KABUSHIKI KAISHA, Toyota (JP)

(72) Inventors: Kuniharu Tsuzuki, Handa (JP); Jumpei Fuke, Toyota (JP); Shimpei Asai, Okazaki (JP); Nobuyoshi Nagai, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/498,944

(22) Filed: Oct. 31, 2023

(65) Prior Publication Data

US 2024/0059250 A1     Feb. 22, 2024

Related U.S. Application Data

(63) Continuation of application No. 17/820,362, filed on Aug. 17, 2022.

(30) Foreign Application Priority Data

Sep. 29, 2021     (JP) ................................. 2021-159846

(51) Int. Cl.
*B60R 25/24*          (2013.01)
*B60R 25/04*          (2013.01)
(Continued)

(52) U.S. Cl.
CPC ............ *B60R 25/245* (2013.01); *B60R 25/04* (2013.01); *B60R 25/102* (2013.01);
(Continued)

(58) Field of Classification Search
None
See application file for complete search history.

(56) References Cited

U.S. PATENT DOCUMENTS

T940,019 I4 *   11/1975   Larson .................... G06F 12/10
                                                                711/206
5,765,648 A       6/1998   Sheehan
(Continued)

FOREIGN PATENT DOCUMENTS

EP          3098784 A2 *   11/2016   ......... G07C 9/00174
JP     2006-207263 A       8/2006
(Continued)

OTHER PUBLICATIONS

Notice of Allowance dated Jul. 31, 2024, issued in corresponding U.S. Appl. No. 17/820,362.

*Primary Examiner* — Carlos Garcia
(74) *Attorney, Agent, or Firm* — Oblon, McClelland, Maier & Neustadt, L.L.P.

(57) ABSTRACT

An information processing device comprising a processor, the processor being configured to: in a case in which a door of a vehicle is locked, determine whether or not a terminal that operates as an electronic key is located in the vehicle; and in a case in which the terminal is determined to be located in the vehicle, perform control to restrict at least a subset of functions, among functions of the vehicle that are controlled in accordance with communications with the terminal, based on a lock trigger causing the locking of the door of the vehicle.

13 Claims, 11 Drawing Sheets

(51) Int. Cl.
    *B60R 25/102*      (2013.01)
    *G07C 9/00*      (2020.01)
    *H04W 4/02*      (2018.01)
    *H04W 4/40*      (2018.01)

(52) U.S. Cl.
    CPC ........ *G07C 9/00309* (2013.01); *H04W 4/023* (2013.01); *H04W 4/40* (2018.02); *B60R 2325/101* (2013.01); *B60R 2325/205* (2013.01); *G07C 2009/00769* (2013.01); *G07C 2209/08* (2013.01); *G07C 2209/62* (2013.01); *G07C 2209/63* (2013.01)

(56)         References Cited

U.S. PATENT DOCUMENTS

| | | | |
|---|---|---|---|
| 6,718,240 B1 | 4/2004 | Suda | |
| 8,768,565 B2 * | 7/2014 | Jefferies | G07C 5/0808 701/32.7 |
| 9,426,225 B2 * | 8/2016 | Penilla | B60L 53/65 |
| 9,426,274 B2 * | 8/2016 | Morgan | B60R 16/037 |
| 10,225,350 B2 * | 3/2019 | Penilla | B60L 53/80 |
| 10,899,315 B2 * | 1/2021 | Reh | G08C 17/02 |
| 10,999,718 B2 * | 5/2021 | Fuke | B60W 50/0098 |
| 11,894,667 B2 * | 2/2024 | Bacchini | H02G 9/08 |
| 11,970,134 B2 * | 4/2024 | Hiruta | G06F 21/121 |
| 12,056,993 B2 * | 8/2024 | Patel | G06Q 30/0609 |
| 12,071,791 B1 * | 8/2024 | Becht, III | E05B 77/54 |
| 12,122,325 B2 * | 10/2024 | Tsuzuki | H04W 4/48 |
| 2007/0199987 A1 * | 8/2007 | Takamura | B60R 16/0231 235/382 |
| 2009/0299229 A1 * | 12/2009 | Johnson | A61G 7/018 600/587 |
| 2010/0071424 A1 * | 3/2010 | Tsuruta | E05B 83/30 70/91 |
| 2010/0167691 A1 * | 7/2010 | Howarter | H04M 1/72463 455/410 |
| 2010/0167714 A1 * | 7/2010 | Howarter | H04M 1/72463 455/418 |
| 2013/0006715 A1 * | 1/2013 | Warkentin | G08G 1/20 705/7.38 |
| 2013/0099892 A1 * | 4/2013 | Tucker | H04L 9/08 340/5.61 |
| 2013/0190978 A1 * | 7/2013 | Kato | H04W 8/24 455/418 |
| 2013/0317693 A1 * | 11/2013 | Jefferies | G06Q 30/0645 701/31.5 |
| 2016/0304055 A1 * | 10/2016 | Murugesan | B60Q 9/00 |
| 2017/0120865 A1 * | 5/2017 | Li | B60R 25/2036 |
| 2018/0120411 A1 * | 5/2018 | Hermann | G07C 9/00309 |
| 2020/0283004 A1 * | 9/2020 | Avetisian | B60R 16/0231 |
| 2021/0122333 A1 * | 4/2021 | Azarko | G07C 9/00309 |
| 2021/0347331 A1 * | 11/2021 | Hiruta | B60R 25/241 |
| 2022/0153229 A1 | 5/2022 | Brockner | |
| 2022/0388477 A1 * | 12/2022 | Lee | H01Q 1/3275 |
| 2023/0054049 A1 * | 2/2023 | Kanata | B60P 3/03 |
| 2023/0096456 A1 * | 3/2023 | Tsuzuki | B60R 25/102 340/5.61 |
| 2023/0219524 A1 * | 7/2023 | Sugita | B60R 25/24 340/4.3 |

FOREIGN PATENT DOCUMENTS

| | | |
|---|---|---|
| JP | 2007-107343 A | 4/2007 |
| JP | 2013-147912 A | 8/2013 |
| JP | 2021-25394 A | 2/2021 |

\* cited by examiner

FIG.5

| LOCK TRIGGER | FUNCTIONS (OPERATIONS FROM PORTABLE TERMINAL) | |
| --- | --- | --- |
| | UNLOCK | START ENGINE |
| MANUAL LOCKING | DISABLED | ENABLED |
| KEY-LINKED LOCKING | DISABLED | DISABLED |
| WIRELESS LOCKING | DISABLED | ENABLED |
| WIRELESS DOUBLE LOCK SET | DISABLED | ENABLED |
| WIRELESS 30 S AUTOLOCK | DISABLED | ENABLED |
| SMART LOCK | ENABLED | DISABLED |
| SMART DOUBLE LOCK SET | ENABLED | DISABLED |
| SMART 30 S AUTOLOCK | ENABLED | DISABLED |
| POWER TAILGATE CLOSE & LOCK | ENABLED | DISABLED |
| SECURITY FORCED LOCK | ENABLED | ENABLED |
| SHIFT-LINKED AUTOLOCK | ENABLED | ENABLED |
| SPEED-LINKED AUTOLOCK | ENABLED | ENABLED |
| ACTIVE TEST (LOCK) | ENABLED | ENABLED |
| DOOR LOCKING WITH PRE-CONDITIONING | DISABLED | ENABLED |
| LOCKING BY REMOTE SERVICE | DISABLED | ENABLED |
| RE-LOCKING BY REMOTE SERVICE | DISABLED | ENABLED |

FIG.8

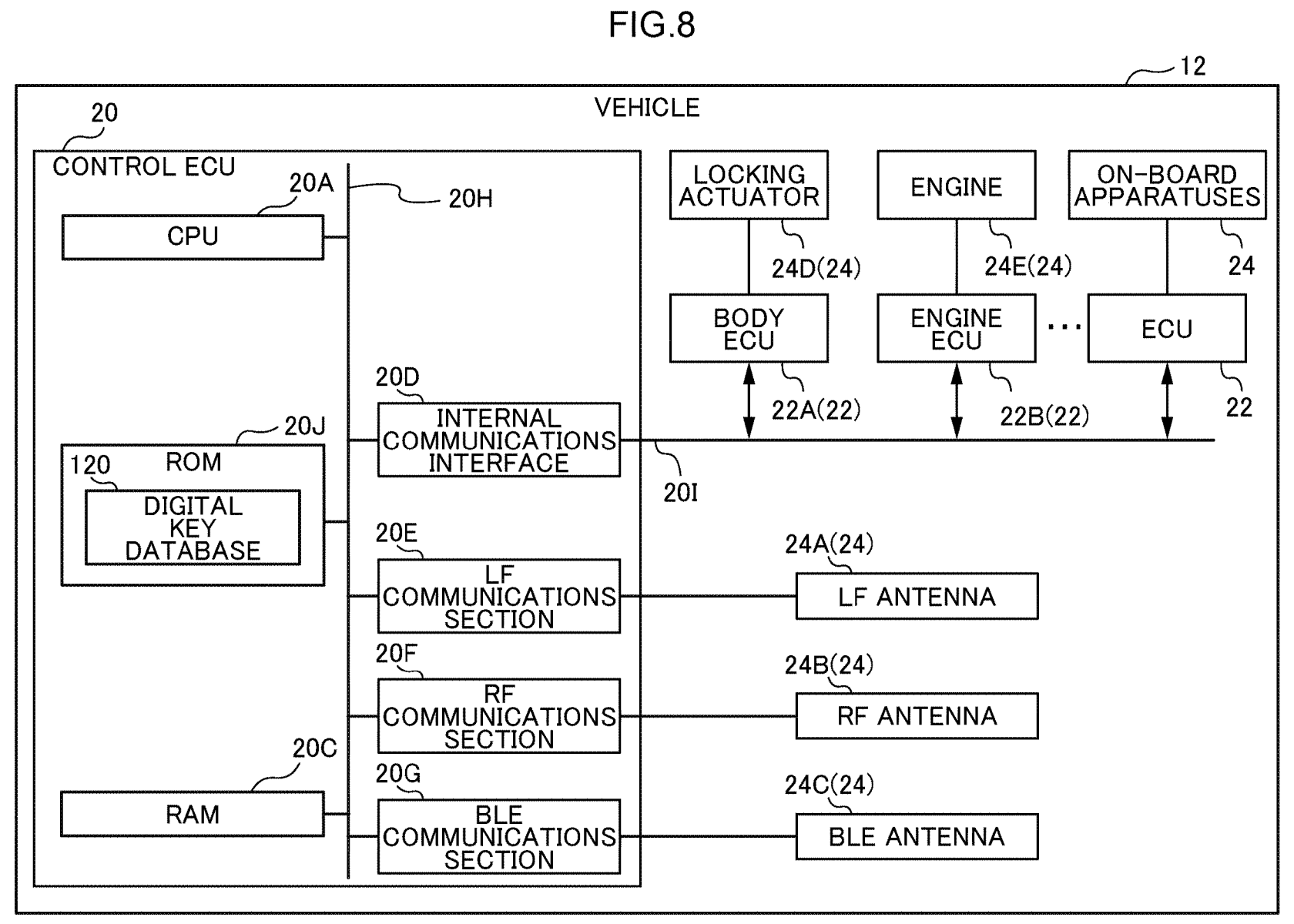

VEHICLE — 12

ON-BOARD APPARATUSES — 24
ECU — 22

ENGINE
ENGINE ECU — 24E(24)
22B(22)

LOCKING ACTUATOR — 24D(24)
BODY ECU — 22A(22)

LF ANTENNA — 24A(24)
RF ANTENNA — 24B(24)
BLE ANTENNA — 24C(24)

20I

CONTROL ECU — 20

CPU — 20A
20H

INTERNAL COMMUNICATIONS INTERFACE — 20D
LF COMMUNICATIONS SECTION — 20E
RF COMMUNICATIONS SECTION — 20F
BLE COMMUNICATIONS SECTION — 20G

ROM — 20J
DIGITAL KEY DATABASE — 120

RAM — 20C

INFORMATION PROCESSING DEVICE, VEHICLE, TERMINAL, INFORMATION PROCESSING METHOD, AND RECORDING MEDIUM STORING INFORMATION PROCESSING PROGRAM

CROSS-REFERENCE TO RELATED APPLICATION

This application is a continuation of U.S. patent application Ser. No. 17/820,362 filed on Aug. 17, 2022 which is based on and claims priority under 35 USC 119 from Japanese Patent Application No. 2021-159846 filed on Sep. 29, 2021, the disclosure of which is incorporated by reference herein.

BACKGROUND

Technical Field

The present disclosure relates to an information processing device that controls unlocking of a vehicle and starting of an engine, and to the vehicle, a terminal, an information processing method, and a recording medium storing an information processing program.

Related Art

Japanese Patent Application Laid-Open (JP-A) No. 2013-147912 discloses a door locking system for a vehicle that performs control so as to lock the vehicle when an electronic key is confirmed to be outside the vehicle but not lock the vehicle when the electronic key is confirmed to be inside the vehicle.

The door locking system for a vehicle according to JP-A No. 2013-147912, for example, makes a determination as to whether a terminal that functions as the electronic key is inside the vehicle. If an erroneous determination in which the terminal is not recognized occurs, the vehicle may become locked in a state in which the terminal is inside the vehicle (has been forgotten). In a situation in which the terminal functioning as the electronic key is inside the vehicle, there is a possibility of a third party performing control of the vehicle that is unintended by an owner of the vehicle.

SUMMARY

An object of the present disclosure is to provide an information processing device that, even in a state in which a terminal functioning as an electronic key is inside a vehicle, may impede use of the terminal to perform control of the vehicle that is not intended by an owner, and to provide the vehicle, the terminal, an information processing method, and a recording medium storing an information processing program.

An information processing device according to a first aspect includes a processor, the processor being configured to: in a case in which a door of a vehicle is locked, determine whether or not a terminal that operates as an electronic key is located in the vehicle; and in a case in which the terminal is determined to be located in the vehicle, perform control to restrict at least a subset of functions, among functions of the vehicle that are controlled in accordance with communications with the terminal, based on a lock trigger causing the locking of the door of the vehicle.

When the vehicle is locked and the terminal that functions as the electronic key is located in the vehicle, the information processing device according to the first aspect restricts functions from the terminal in accordance with the lock trigger causing the locking of the vehicle.

That is, according to this information processing device, even in a situation in which the terminal functioning as the electronic key is located in the vehicle, use of the terminal to perform control of the vehicle that is not intended by an owner of the vehicle may be suppressed.

In an information processing device according to a second aspect, in the information processing device according to the first aspect, the subset of functions that the processor performs control to restrict includes at least one of unlocking of the door of the vehicle and starting of an engine of the vehicle from the terminal.

According to the information processing device according to the second aspect, functions of the vehicle may be restricted while operability from the terminal is maintained.

In an information processing device according to a third aspect, in the information processing device according to the first aspect or the second aspect, the processor is configured to determine whether or not the terminal is located in the vehicle when a certain duration has passed after the door of the vehicle is locked.

According to the information processing device according to the third aspect, if the electronic key is accidentally left in the vehicle, functions are not restricted and the door of the vehicle may be unlocked until the certain duration has passed.

In an information processing device according to a fourth aspect, in the information processing device according to any one of the first to third aspects, the processor is configured to remove the restriction of the functions in a case in which a user carrying the terminal is successfully authenticated and information representing an electronic key that is stored at the terminal corresponds with information representing the electronic key that is stored in advance at the vehicle.

According to the information processing device according to the fourth aspect, users and electronic keys that are allowed to remove restrictions on the functions thereof may be registered in advance.

In an information processing device according to a fifth aspect, in the information processing device according to any one of the first to fourth aspects, the processor is configured to use restriction settings information for restricting the functions, the restriction settings information relating to a specification of restrictions of the functions in accordance with the lock trigger.

According to the information processing device according to the fifth aspect, a situation of an owner of the vehicle may be assumed and the functions restricted accordingly.

In an information processing device according to a sixth aspect, in the information processing device according to the fifth aspect, the processor is configured to accept input of a specification relating to the restriction settings information from a user.

According to the information processing device according to the sixth aspect, the user may specify a desired restriction of the functions.

In an information processing device according to a seventh aspect, in the information processing device according to the fifth aspect, the restriction settings information includes a specification that corresponds to the lock trigger being a locking operation performed when a user boards the vehicle or a locking operation performed when the user disembarks from the vehicle.

According to the information processing device according to the seventh aspect, the restriction of the functions may be specified in accordance with a situation of the user after the locking.

In an information processing device according to an eighth aspect, in the information processing device according to any one of the fifth to seventh aspects, the processor is further configured to accept input of a modification of the restriction settings information.

According to the information processing device according to the eighth aspect, a restriction of the functions may be specified in accordance with a change of circumstances.

In an information processing device according to a ninth aspect, in the information processing device according to any one of the first to eighth aspects, the processor is further configured to use a communication result between the terminal and a communication device on board the vehicle to detect the terminal and make a determination as to whether the terminal is located in the vehicle.

According to the information processing device according to the ninth aspect, it may be confirmed that the terminal is located in a range in which communications are conducted, and the terminal may be detected more accurately.

In an information processing device according to a tenth aspect, in the information processing device according to any one of the first to ninth aspects, the processor is further configured to, when the functions are restricted, notify a user that the functions are restricted.

According to the information processing device according to the tenth aspect, the user may easily recognize that the functions of the vehicle are restricted.

A vehicle according to an eleventh aspect includes the information processing device according to any one of the first to tenth aspects, the vehicle being configured to be capable of communications with the terminal.

According to the vehicle according to the eleventh aspect, a restriction of the functions of the vehicle may be controlled.

A terminal according to a twelfth aspect includes the information processing device according to any one of the first to tenth aspects, the terminal being configured to be capable of communications with the vehicle.

According to the terminal according to the twelfth aspect, costs of restricting functions of the vehicle may be further suppressed.

In a terminal according to a thirteenth aspect, in the terminal according to the twelfth aspect, the terminal acquires the lock trigger causing the locking of the door of the vehicle from the vehicle.

According to the terminal according to the thirteenth aspect, the lock trigger of the vehicle may be identified.

An information processing method according to a fourteenth aspect includes: in a case in which a door of a vehicle is locked, determining whether or not a terminal that operates as an electronic key is located in the vehicle; and in a case in which the terminal is determined to be located in the vehicle, performing control to restrict at least a subset of functions, among functions of the vehicle that are controlled in accordance with communications with the terminal, based on a lock trigger causing the locking of the door of the vehicle.

When the vehicle is locked and the terminal that functions as the electronic key is located in the vehicle, the information processing method according to the fourteenth aspect restricts functions from the terminal in accordance with the lock trigger causing the locking of the vehicle. That is, according to this information processing method, even in a situation in which the terminal functioning as the electronic key is located in the vehicle, use of the terminal to perform control of the vehicle that is not intended by an owner of the vehicle may be suppressed.

A fifteenth aspect is a non-transitory recording medium storing an information processing program. The information processing program includes: in a case in which a door of a vehicle is locked, determining whether or not a terminal that operates as an electronic key is located in the vehicle; and in a case in which the terminal is determined to be located in the vehicle, performing control to restrict at least a subset of functions, among functions of the vehicle that are controlled in accordance with communications with the terminal, based on a lock trigger causing the locking of the door of the vehicle.

When the vehicle is locked and the terminal that functions as the electronic key is located in the vehicle, a computer executing the information processing program stored at the non-transitory recording medium according to the fifteenth aspect restricts functions from the terminal in accordance with the lock trigger causing the locking of the vehicle. That is, according to this computer, even in a state in which the terminal functioning as the electronic key is located in the vehicle, use of the terminal to perform control of the vehicle that is not intended by an owner of the vehicle may be suppressed.

According to the present disclosure, even in a state in which a terminal functioning as an electronic key is inside a vehicle, use of the terminal to perform control of the vehicle that is not intended by an owner may be suppressed.

BRIEF DESCRIPTION OF THE DRAWINGS

An exemplary embodiment of the present disclosure will be described in detail based on the following figures, wherein:

FIG. 5 is a diagram showing restriction settings information, for describing restrictions of functions according to the exemplary embodiments;

FIG. 8 is a block diagram showing hardware structures of a vehicle according to a second exemplary embodiment;

DETAILED DESCRIPTION

An information processing system including an information processing device according to the present disclosure is described. The information processing device functions as a control device that performs control to restrict functions of unlocking a door and starting an engine from a terminal.

First Exemplary Embodiment

Figure 1:
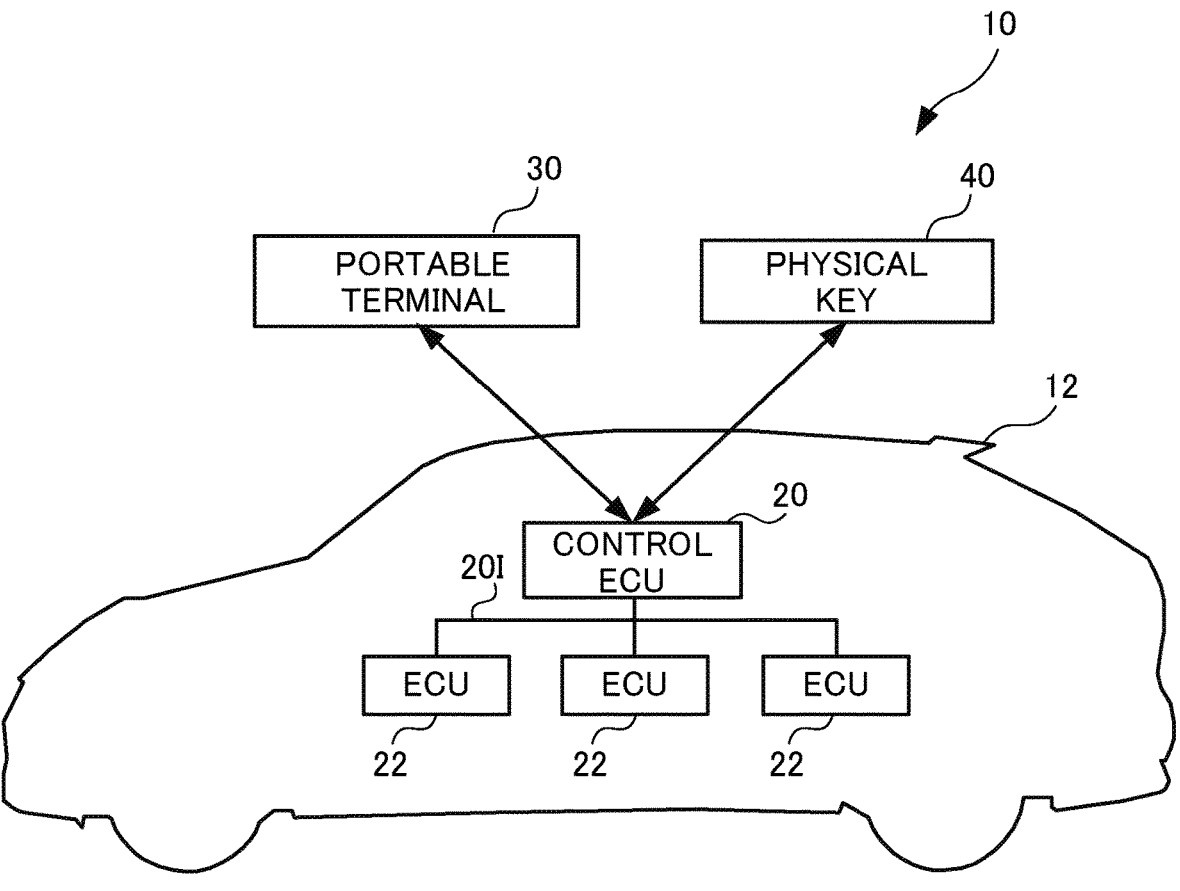
FIG. 1 is a diagram showing a schematic configuration of an information processing system according to exemplary embodiments.

As shown in FIG. 1, an information processing system 10 according to the present embodiment includes a vehicle 12, a portable terminal 30 and a physical key 40. The vehicle 12 includes a control electronic control unit (ECU) 20, which serves as the information processing device, and plural ECUs 22, which are devices that control equipment on board the vehicle 12. The control ECU 20 and the portable terminal 30 are capable of connecting with one another by Bluetooth Low Energy (BLE) communications. The control ECU 20 and the physical key 40 are capable of connecting with one another by wireless communications in the low frequency (LF) band and radio frequency (RF) band.

The control ECU 20 includes a function for acquiring communication information based on the controller area network (CAN) protocol that is transmitted from the ECUs 22. The control ECU 20 controls the ECUs 22 in accordance with signals received from the portable terminal 30.

An engine ECU and a body ECU can be mentioned as examples of the ECUs 22 according to the present embodiment. The control ECU 20 and the ECUs 22 are connected with one another via an external bus 20I.

The portable terminal 30 is a terminal that may be carried by an owner of the vehicle 12, such as a smartphone or the like. A digital key associated with the vehicle 12 may be memorized at the portable terminal 30 in advance. The portable terminal 30 is capable of operations such as using the digital key to remotely lock and unlock doors of the vehicle 12, start an engine and so forth. When the portable terminal 30 receives a message from the vehicle 12, the portable terminal 30 displays the message at a monitor screen. When a restriction of a function is implemented at the vehicle 12, the portable terminal 30 transmits request signals for removal of the restriction. This portable terminal 30 is an example of a "terminal that operates as an electronic key". However, this is not limiting. For example, provided the terminal may be carried by the owner of the vehicle 12, the terminal may be a tablet, a car navigation device or the like. The digital key according to the present embodiment is an example of "information representing an electronic key".

The physical key 40 is a wireless key that may be carried by the owner of the vehicle 12. A digital key associated with the vehicle 12 is memorized at the physical key 40 in advance. The physical key 40 is capable of operations such as using the digital key to remotely lock and unlock the doors of the vehicle 12, start the engine and so forth.

Vehicle

Figure 2:
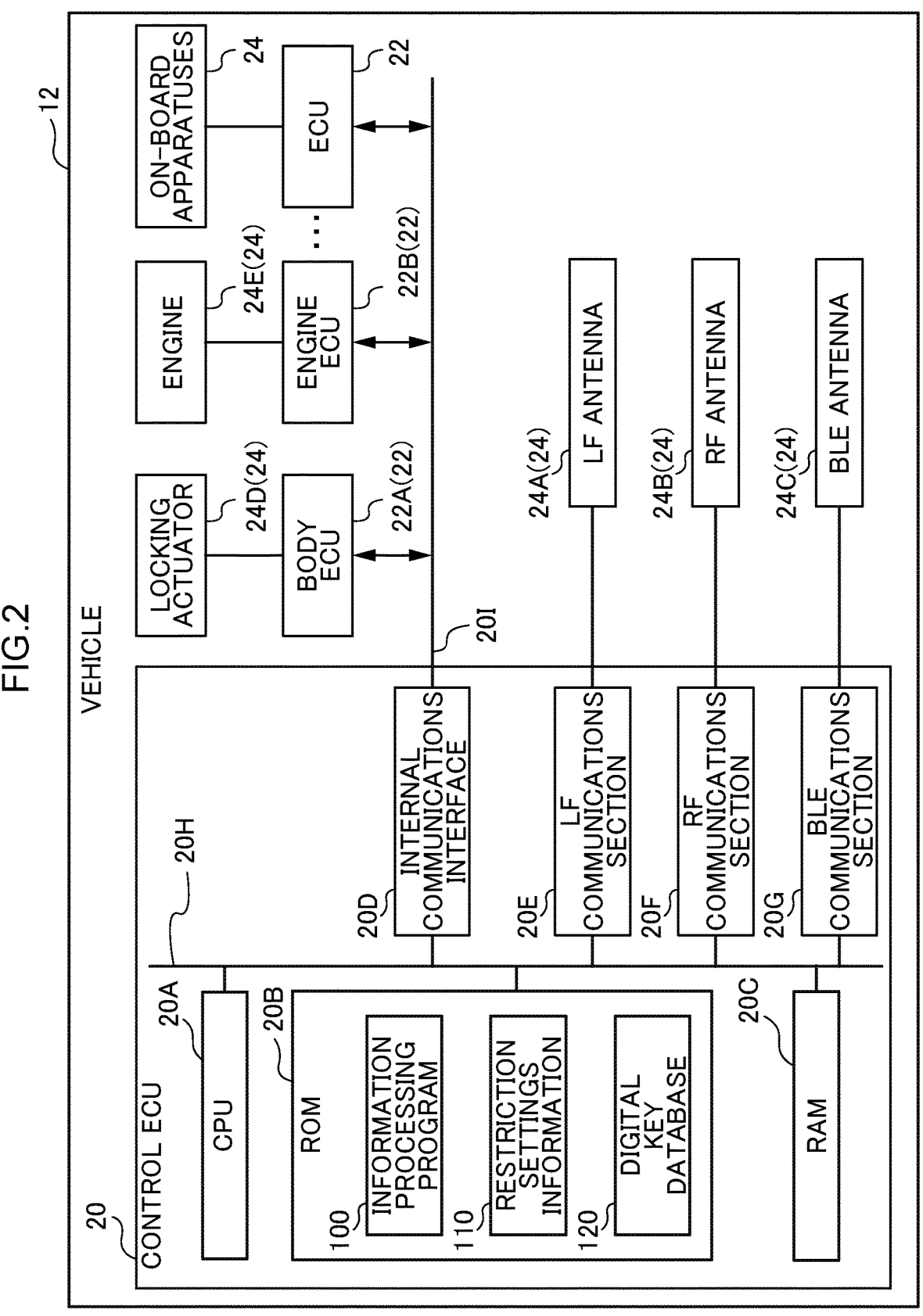
FIG. 2 is a block diagram showing hardware structures of a vehicle according to a first exemplary embodiment.

As shown in FIG. 2, the vehicle 12 according to the present embodiment includes the control ECU 20, the plural ECUs 22, and plural on-board apparatuses 24.

The control ECU 20 includes a central processing unit (CPU) 20A, read-only memory (ROM) 20B, random access memory (RAM) 20C, an internal communications interface 20D, an LF communications section 20E, an RF communications section 20F and a BLE communications section 20G. The CPU 20A, ROM 20B, RAM 20C, internal communications interface 20D, LF communications section 20E, RF communications section 20F and BLE communications section 20G are connected to be capable of communications with one another via an internal bus 20H. The CPU 20A is an example of a processor.

The CPU 20A is a central arithmetic processing unit that executes various programs and controls respective parts. That is, the CPU 20A reads a program from the ROM 20B and executes the program, using the RAM 20C as a workspace.

The ROM 20B serves as a memory section and memorizes various programs and various kinds of data. The ROM 20B according to the present embodiment memorizes an information processing program 100 that implements restrictions of functions of the vehicle 12 based on restriction settings information 110, which is described below. The ROM 20B memorizes the restriction settings information 110, which is specifications relating to restrictions of functions of the vehicle 12, and a digital key database (DB) 120, which relates to digital keys registered in advance.

The RAM 20C serves as a work area and temporarily memorizes programs and data.

The internal communications interface 20D is an interface for connecting with the ECUs 22. This interface employs, for example, a communications standard based on the CAN protocol. The internal communications interface 20D is connected to the external bus 20I.

The LF communications section 20E is connected with an LF antenna 24A. The LF communications section 20E is a wireless communications module for communicating with devices such as the physical key 40 and the like via the LF antenna 24A. The LF antenna 24A is a communications apparatus that implements wireless communications in the LF band. The LF antenna 24A transmits request signals to the physical key 40 that functions as a remote control. The LF antenna 24A is disposed at, for example, a driver seat door, a front passenger seat door, rear doors and a tailgate.

The RF communications section 20F is connected with an RF antenna 24B. The RF communications section 20F is a wireless communications module for communicating with devices such as the physical key 40 and the like via the RF antenna 24B. The RF antenna 24B is a communications apparatus that implements wireless communications in the RF band. The RF antenna 24B receives response signals from the physical key 40.

The BLE communications section 20G is connected with a BLE antenna 24C. The BLE communications section 20G is a wireless communications module for communicating with devices such as the portable terminal 30 and the like via the BLE antenna 24C. The BLE antenna 24C is a communications apparatus that implements wireless communications in the Bluetooth frequency band (2.4 GHz). The BLE antenna 24C transmits request signals to the portable terminal 30 and receives response signals from the portable terminal 30.

The ECUs 22 include at least a body ECU 22A and an engine ECU 22B.

The body ECU 22A controls body parts of the vehicle 12. The body ECU 22A is connected to locking actuators 24D that constitute the on-board apparatuses 24. The body ECU 22A implements locking and unlocking of doors of the vehicle 12 in response to commands for locking and unlocking of the doors of the vehicle 12. The locking actuators 24D lock and unlock the doors in response to commands.

The engine ECU 22B controls an engine 24E of the vehicle 12. The engine ECU 22B is connected with the engine 24E, which drives the vehicle 12.

The information processing program 100 is a program for controlling the control ECU 20. The restriction settings information 110 is information that specifies whether or not execution commands for a function received from the portable terminal 30 are to be enabled when the doors of the vehicle 12 are locked and that function of the vehicle 12 is restricted. The restriction settings information 110 specifies that an execution command for a function received from the portable terminal 30 is to be "enabled" or "disabled" for each of functions and for each of lock triggers. The meaning of the term "function" as used in the present embodiment is intended to include unlocking a door of the vehicle 12 and starting the engine of the vehicle 12. The digital key database 120 memorizes digital keys associated with the vehicle 12, which are registered in advance.

Figure 3:
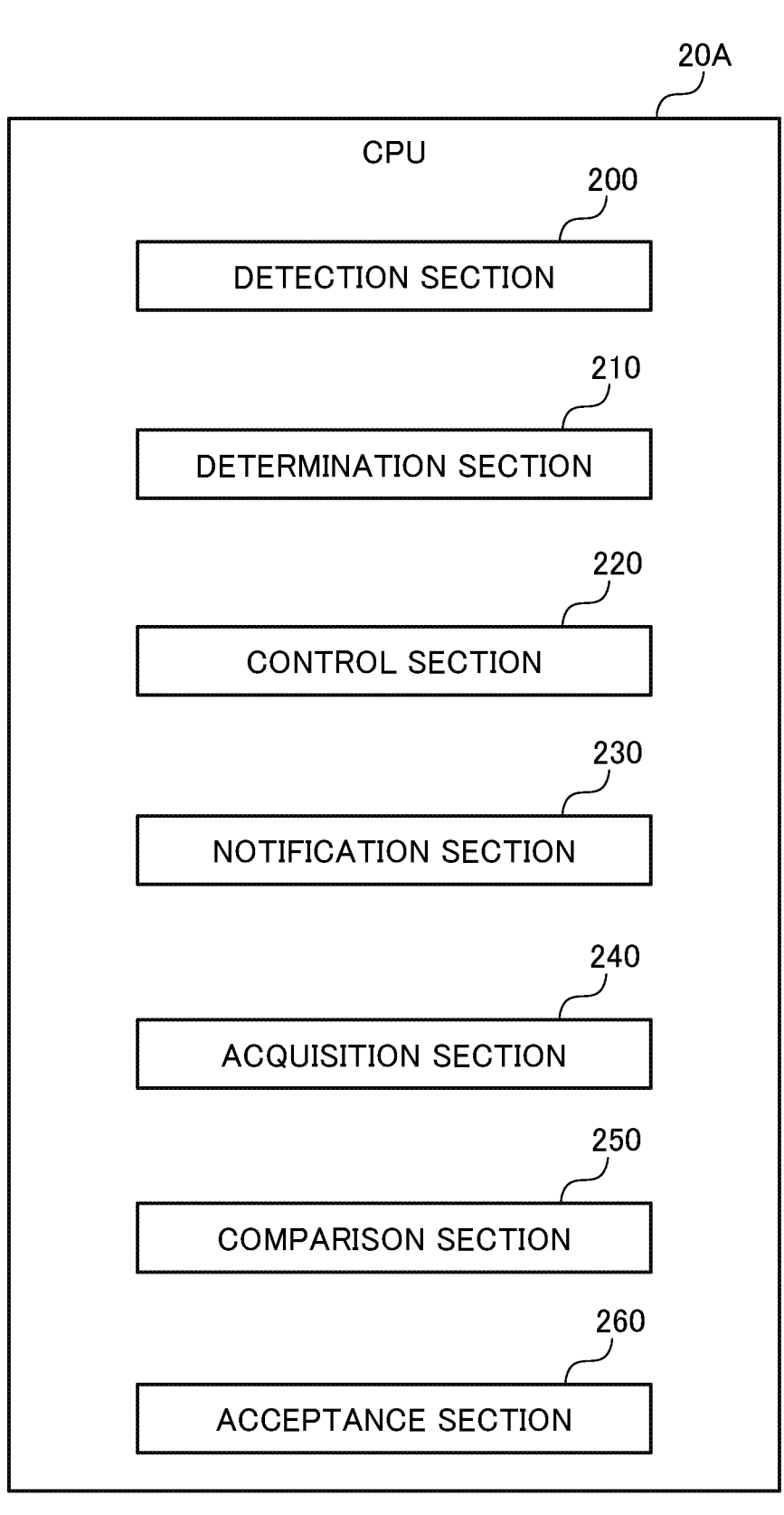
FIG. 3 is a block diagram showing functional structures of on-board equipment according to the first exemplary embodiment.

As shown in FIG. 3, in the control ECU 20 according to the present embodiment, by executing the information processing program 100, the CPU 20A functions as a detection section 200, a determination section 210, a control section 220, a notification section 230, an acquisition section 240, a comparison section 250 and an acceptance section 260.

Figure 4:
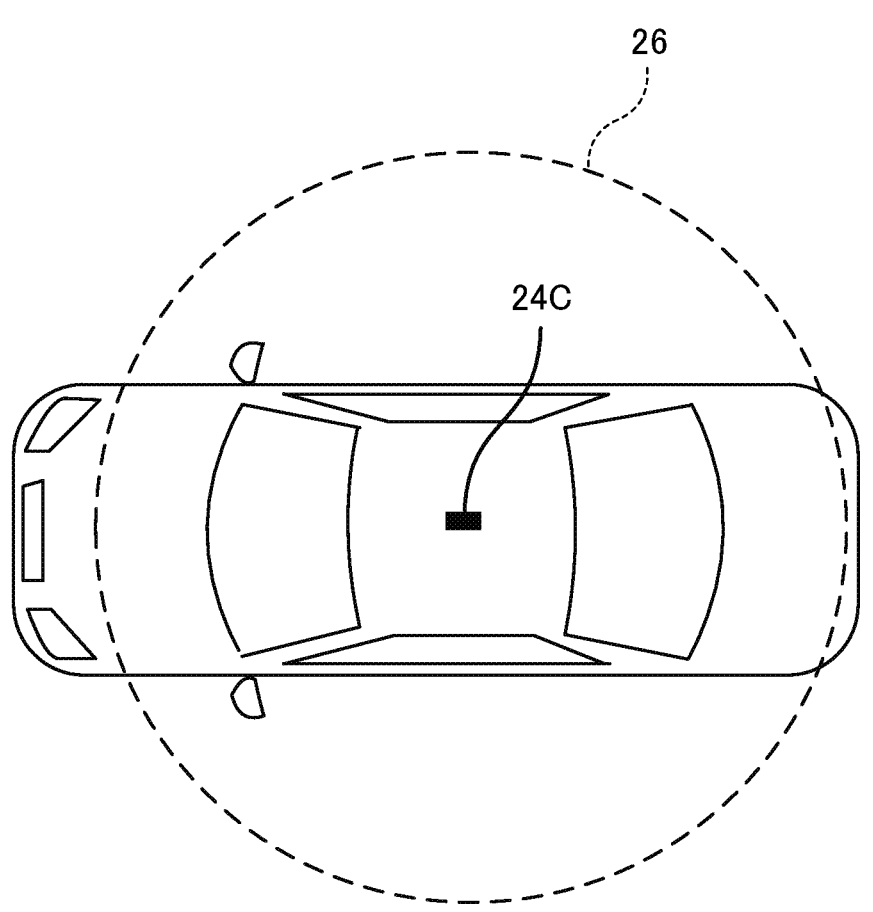
FIG. 4 is a plan view showing a vehicle, seen from above, for describing a detection area according to the exemplary embodiments.

The detection section 200 detects whether the portable terminal 30 is in a cabin of the vehicle 12. More specifically, the detection section 200 uses BLE communications to communicate with the portable terminal 30. For example, the detection section 200 uses BLE communications to transmit request signals to the portable terminal 30 and detects the presence of the portable terminal 30 by detecting response signals responding to the request signals. As an example, the BLE antenna 24C that implements BLE communications is disposed inside a center console of the vehicle 12 or the like. Consequently the portable terminal 30 may be detected when located in a detection area 26, an example of which is shown in FIG. 4. The present embodiment describes a mode in which the BLE antenna 24C is disposed in the center console, but this is not limiting. A plural number of the BLE antenna 24C may be disposed in an upper portion of a front door, an upper portion of a rear door, an upper portion of the tailgate, and the like. The BLE antenna 24C is an example of a "communication device", and the detection of response signals to request signals is an example of a "communication result".

The determination section 210 makes a determination as to whether to implement a restriction of functions of the vehicle 12. More specifically, when the doors of the vehicle 12 are locked, the determination section 210 makes a determination as to whether the portable terminal 30 is located in the cabin of the vehicle 12, which is contained in the detection area 26. If the portable terminal 30 is located in the cabin, the determination section 210 determines to implement the restriction of the functions. This determination by the determination section 210 is carried out after a certain duration has passed after the doors of the vehicle 12 are locked.

In the present embodiment, a mode is described in which the portable terminal 30 is determined to be located in the cabin of the vehicle 12 when the portable terminal 30 is contained in the detection area 26. However, this is not limiting. Distances between the plural BLE antennas 24C and the portable terminal 30 may be measured, and the measured distances may be used to make the determination as to whether the portable terminal 30 is located in the cabin of the vehicle 12. For example, the detection section 200 detects a signal strength of the portable terminal 30 at each BLE antenna 24C and uses the signal strength to detect the distance from that BLE antenna 24C to the portable terminal 30. The determination section 210 then uses the respective detected distances from the BLE antennas 24C to determine the position of the portable terminal 30 and make the determination as to whether the portable terminal 30 is located in the cabin of the vehicle 12.

When a determination is made to implement a restriction of functions of the vehicle 12, based on the restriction settings information 110, the control section 220 implements a restriction of at least a subset of functions of the vehicle 12 that are controlled in accordance with communications with the portable terminal 30. The meaning of the term "subset of functions" as used here is intended to include functions for unlocking the doors of the vehicle 12 and for starting the engine of the vehicle 12; a restriction of at least one of these functions is implemented. A restriction of the functions means that, for example, if "disabled" is specified in the restriction settings information 110, then even if a command to unlock the doors is entered from the portable terminal 30, the control section 220 performs control such that the unlocking is not conducted. The functions may be restricted by control by the control section 220 to manage commands that are sent to the body ECU 22A and the engine ECU 22B according to the specifications in the restriction settings information 110.

As shown by the example in FIG. 5, the restriction settings information 110 is specified such that restrictions are implemented for each of the lock triggers and for each of the functions. The restriction settings information 110 according to the present embodiments specifies "enabled" or "disabled" for each of the lock triggers and each of the functions.

When a lock trigger is the doors being locked in a state in which the owner is on board the vehicle 12 (the owner of the vehicle 12 is assumed to be in the cabin), "disabled" is specified for "unlock" in the restriction settings information 110, and "enabled" is specified for "start engine". For example, when the vehicle 12 is locked by manual locking such as a door control switch provided in the vehicle 12 or the like and the functions are restricted, the control section 220 performs control to disable unlocking from the portable terminal 30 but enable starting of the engine from the portable terminal 30. The control described above enables the owner of the vehicle 12 to move the vehicle 12 promptly even when a restriction of the functions that is not intended by the owner is implemented. Meanwhile, entry into the vehicle by a third party outside the vehicle is impeded.

Alternatively, when a lock trigger is the doors being locked in a state in which the owner has disembarked from the vehicle 12 (the owner of the vehicle 12 is assumed not to be in the cabin), "enabled" is specified for unlock in the restriction settings information 110, and "disabled" is specified for start engine. For example, when the vehicle 12 is locked by a smart lock that locks when the physical key 40 is being carried and a door handle is touched or the like and the functions are restricted, the control section 220 performs control to enable unlocking but disable starting of the engine from the portable terminal 30. The control described above enables the owner to retrieve the portable terminal 30 from outside the vehicle when the owner has forgotten the portable terminal 30 in the vehicle 12. Meanwhile, taking away of the vehicle 12 by a third party is impeded.

"Key-linked locking" shown in the restriction specification information in FIG. 5 refers to an operation that implements locking when a mechanical key that is stowed in the physical key 40 is inserted in a key cylinder (not shown in the drawings). "Wireless locking" refers to an operation that implements locking when response signals are received by wireless communications in the RF band from the physical key 40 at which the digital key is memorized. "Wireless double lock set" refers to an operation that implements locking and provides a function that restricts unlocking from inside the vehicle when a lock button provided at the physical key 40 is pressed twice. "Wireless 30 s autolock" refers to an operation that implements locking when no operation to open a door is performed for 30 seconds after the doors are unlocked by the physical key 40. "Smart lock" refers to an operation that implements locking when response signals by wireless communications in the RF band are received from the portable terminal 30 within the LF band communication area provided at the vehicle 12 and the portable terminal 30 is touched against a sensor provided at the door handle. "Smart double lock set" refers to an operation that implements locking and provides a function that restricts unlocking from inside the vehicle when the physical key 40 is carried and touched against the sensor provided at the door handle twice. "Smart 30 s autolock" refers to an operation that implements locking when no operation to open a door is performed for 30 seconds after the doors are unlocked by the physical key 40 being carried and touched against the sensor provided at the door handle. "Power tailgate close & lock" refers to an operation that implements locking when the tailgate, which is disposed at a rear portion of the vehicle 12, is closed. "Security forced lock" refers to an operation that forcibly implements locking when unlocking of a door by an unapproved method is detected. "Shift-linked autolock" refers to an operation that implements locking in response to operation of a shift lever of the vehicle 12. "Speed-linked autolock" refers to an operation that implements locking in accordance with a speed of the vehicle 12. "Active test (lock)" refers to an operation that implements locking of the vehicle 12 when an actuator or the like of the vehicle 12 is activated using a testing tool or the like. "Door locking with pre-conditioning" refers to an operation that implements locking of the vehicle 12 when temperature or the like is being adjusted before the owner boards the vehicle. "Locking by remote service" refers to an operation that implements locking of the vehicle 12 by remote operation from an external server or the like. "Re-locking by remote service" refers to an operation that implements locking of the vehicle 12 by repeated remote operation when locking by remote operation from the external server or the like has been unsuccessful.

When a restriction of the functions is implemented, the notification section 230 notifies the portable terminal 30 with a message that the functions are restricted.

The acquisition section 240 acquires, from the portable terminal 30, information that the owner of the portable terminal 30 has been successfully authenticated and a digital key 130.

The comparison section 250 makes a determination by comparison as to whether the acquired digital key 130 corresponds with a digital key memorized in advance in the digital key database 120. When the comparison section 250 determines that the acquired digital key 130 corresponds with a digital key memorized in advance in the digital key database 120, the control section 220 removes the restriction of the functions.

The acceptance section 260 accepts input of a specification for the restriction settings information and modifies the restriction settings information. For example, the acceptance section 260 may accept input of settings for the restriction settings information from the portable terminal 30 and modify the memorized restriction settings information 110, or may accept input of settings for the restriction settings information from a center server, which is not shown in the drawings, and modify the memorized restriction settings information 110. The acceptance section 260 according to the present embodiment illustrates a mode of accepting a modification to the restriction settings information, but this is not limiting. The acceptance section 260 may also accept input of initial specifications of the restriction settings information. For example, the acceptance section 260 may accept input of restriction settings information that is specifications relating to all lock triggers from the portable terminal 30 or a center server that is not shown in the drawings and memorize this restriction settings information in the ROM 20B.

Portable Terminal

Figure 6:
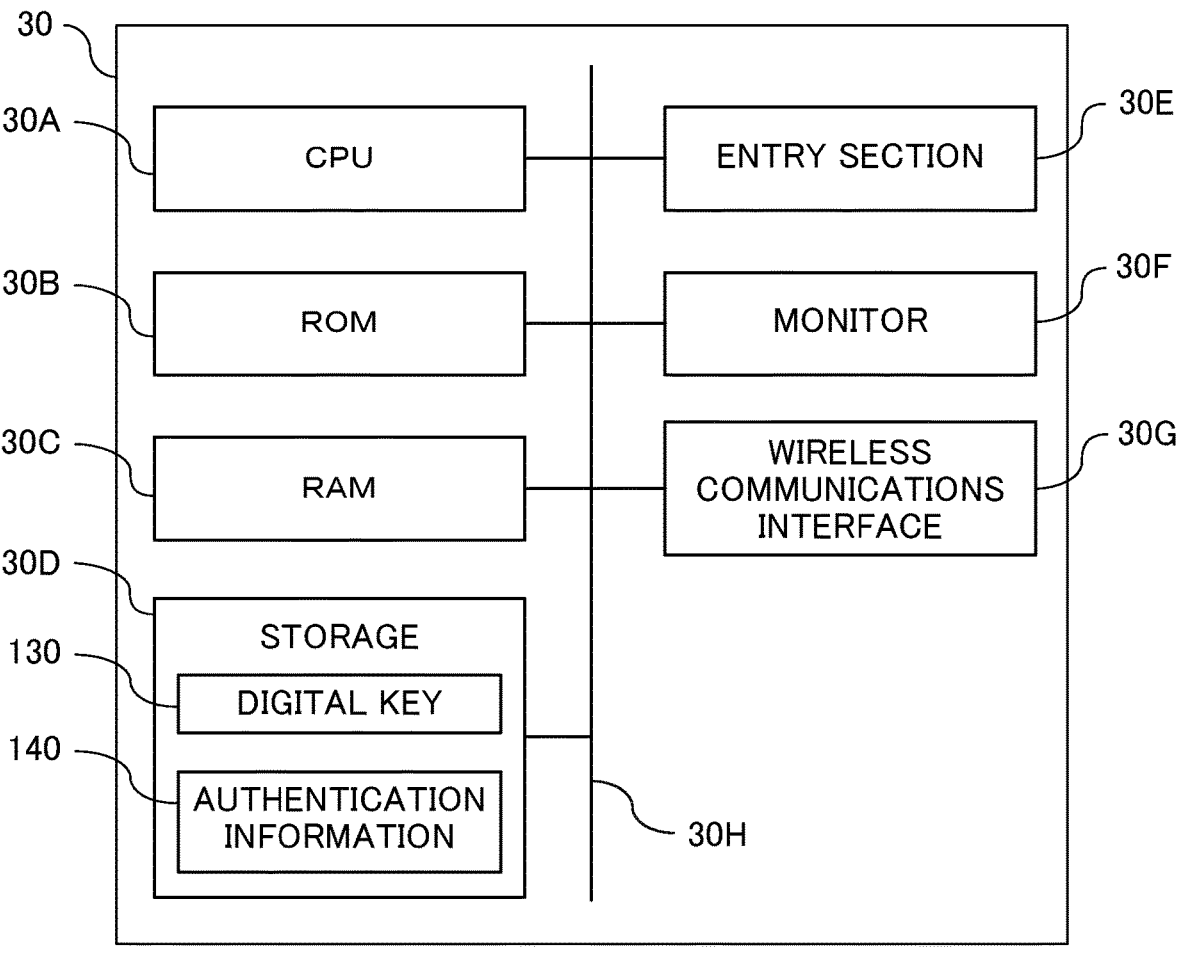
FIG. 6 is a block diagram showing hardware structures of a portable terminal according to the first exemplary embodiment.

As shown in FIG. 6, the portable terminal 30 includes a CPU 30A, ROM 30B, RAM 30C, storage 30D, an entry section 30E, a monitor 30F and a wireless communications interface 30G. The CPU 30A, ROM 30B, RAM 30C, storage 30D, entry section 30E, monitor 30F and wireless communications interface 30G are connected to be capable of communications with one another via an internal bus 30H. Functions of the CPU 30A, ROM 30B and RAM 30C are similar to the CPU 20A, ROM 20B and RAM 20C of the control ECU 20 described above.

The storage 30D serves as a memory section and includes a hard disk drive (HDD) or solid state drive (SSD). The storage 30D memorizes various programs and various kinds of data. The storage 30D according to the present embodiment memorizes the digital key 130, authentication information 140 and various programs. The digital key 130, authentication information 140 and various programs may be memorized in the ROM 30B.

The authentication information 140 is information representing the owner of the vehicle 12, which is registered in advance. For example, the portable terminal 30 compares authentication information entered by the owner of the vehicle 12 with the authentication information 140 registered in advance to authenticate the owner.

The entry section 30E is buttons, a keyboard, a touch panel or the like for entering text and the like. The monitor 30F is a display that displays image data, text and the like.

The wireless communications interface 30G is an apparatus that uses BLE communications for wireless communications with the control ECU 20 of the vehicle 12. The wireless communications interface 30G according to the present embodiment illustrates a mode in which the BLE communications standard is employed, but this is not limiting. The wireless communications interface 30G may employ a communications standard such as 5G, LTE, Wi-Fi (registered trademark) or the like.

The portable terminal 30 according to the present embodiment conducts BLE communications with the control ECU 20 by executing a program memorized at the storage 30D. For example, when the portable terminal 30 receives request signals from the control ECU 20 by BLE communications, the portable terminal 30 transmits response signals responding to the request signals to the control ECU 20. When the portable terminal 30 receives a message by BLE communications, the portable terminal 30 displays the received message at the monitor 30F. When the portable terminal 30 uses authentication information entered by the owner of the vehicle 12 to authenticate the owner of the vehicle 12, the portable terminal 30 uses BLE communications to transmit information that the owner of the vehicle 12 has been successfully authenticated to the control ECU 20 with the digital key 130 memorized in the storage 30D.

Flow of Processing

Figure 7:
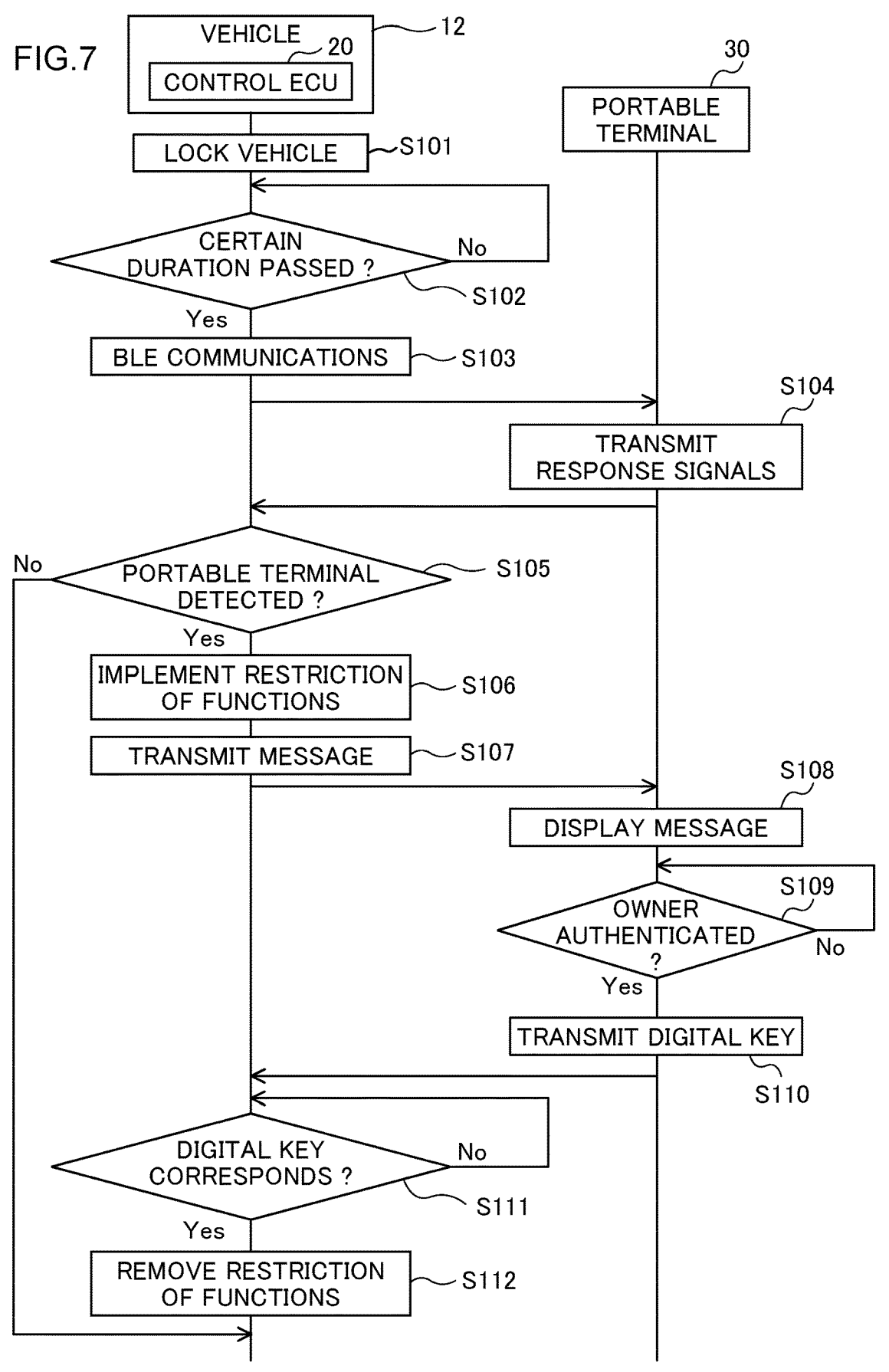
FIG. 7 is a sequence diagram showing flows of processing executed in the information processing system according to the first exemplary embodiment.

Now, a flow of processing of the information processing system 10 that is executed by the control ECU 20 and the portable terminal 30 in cooperation is described with reference to FIG. 7. FIG. 7 is a sequence diagram showing an example of flows of processing in the information processing system 10 according to the present exemplary embodiment. The information processing at the control ECU 20 is realized by the CPU 20A executing the information processing program 100 and functioning as the detection section 200, the determination section 210, the control section 220, the notification section 230, the acquisition section 240, the comparison section 250 and the acceptance section 260.

As shown by the example in FIG. 7, the control ECU 20 locks the doors of the vehicle (step S101) and makes a determination as to whether a certain duration has passed after the locking of the doors (step S102). When the certain duration has passed after locking the doors ("Yes" in step S102), the control ECU 20 transmits request signals to the portable terminal 30 by BLE communications (step S103). On the other hand, while the certain duration has not passed after locking the doors ("No" in step S102), the control ECU 20 waits until the certain duration has passed.

The portable terminal 30 receives the request signals from the control ECU 20 by BLE communications and transmits response signals responding to the request signals to the control ECU 20 (step S104).

The control ECU 20 makes a determination as to whether response signals from the portable terminal 30 have been received and the portable terminal 30 has been detected (step S105). When the control ECU 20 receives the response signals and can detect the portable terminal 30 ("Yes" in step S105), the portable terminal 30 implements a restriction of functions of the vehicle 12 (step S106). Alternatively, when the control ECU 20 cannot detect response signals from the portable terminal 30 and cannot detect the portable terminal 30 ("No" in step S105), the control ECU 20 does not implement a restriction of the functions of the vehicle 12.

After the control ECU 20 implements the restriction of the functions, the control ECU 20 transmits a message to the portable terminal 30 that the restriction of the functions has been implemented (step S107).

The portable terminal 30 displays the message received from the control ECU 20 at the monitor 30F (step S108). The portable terminal 30 makes a determination as to whether authentication information has been accepted from the owner of the vehicle 12 and the owner of the vehicle 12 has been authenticated (step S109). When the portable terminal 30 accepts input of the authentication information from the owner of the vehicle 12 and the owner of the vehicle 12 is authenticated ("Yes" in step S109), the portable terminal 30 transmits information that the owner of the vehicle 12 has been authenticated to the control ECU 20 with the digital key 130 memorized in the storage 30D (step S110). On the other hand, while authentication information is not accepted from the owner of the vehicle 12 and the owner of the vehicle 12 is not authenticated ("No" in step S109), the portable terminal 30 waits until authentication information is accepted from the owner of the vehicle 12 and the owner of the vehicle 12 is authenticated.

The control ECU 20 receives the information that the owner of the vehicle 12 has been successfully authenticated and the digital key 130 from the portable terminal 30, and makes a determination as to whether the acquired digital key corresponds with the digital key database 120 registered in advance (step S111). When the acquired digital key 130 corresponds with the digital key database 120 registered in advance ("Yes" in step S111), the control ECU 20 removes the restriction of the functions of the vehicle 12 (step S112). On the other hand, when the acquired digital key 130 does not correspond with the digital key database 120 registered in advance ("No" in step S111), the control ECU 20 does not remove the restriction of the functions of the vehicle 12 but waits until the digital key 130 is received.

Summary of the First Exemplary Embodiment

When the vehicle 12 is locked and the portable terminal 30 that functions as an electronic key is located in the vehicle, the control ECU 20 according to the present exemplary embodiment restricts functions from the portable terminal 30 in accordance with a lock trigger causing the locking of the vehicle 12.

According to the present exemplary embodiment described above, the control ECU 20 may be utilized to suppress use of the portable terminal 30 to perform control of the vehicle 12 that is not intended by the owner of the vehicle 12, even in a state in which the portable terminal 30 functioning as an electronic key is located inside the vehicle.

Second Exemplary Embodiment

In the first exemplary embodiment, a mode is described in which the information processing device is installed at the control ECU 20. In the present exemplary embodiment, a mode is described in which the information processing device is installed at the portable terminal 30.

Of structures of the information processing system according to the present exemplary embodiment (see FIG. 1), the example of the detection area 26 detected by the vehicle 12 (see FIG. 4) and the example of the restriction settings information (see FIG. 5) are the same as in the first exemplary embodiment and are not described here. Below, differences from the first exemplary embodiment are described. The same reference symbols are applied to structures that are the same, and descriptions thereof are not given.

As shown in FIG. 8, the vehicle 12 according to the present exemplary embodiment includes the control ECU 20, the plural ECUs 22 and the plural on-board apparatuses 24.

The control ECU 20 includes the CPU 20A, ROM 20J, the RAM 20C, the internal communications interface 20D, the LF communications section 20E, the RF communications section 20F and the BLE communications section 20G. The CPU 20A, ROM 20J, RAM 20C, internal communications interface 20D, LF communications section 20E, RF communications section 20F and BLE communications section 20G are connected to be capable of communications with one another via the internal bus 20H. The CPU 20A, RAM 20C, internal communications interface 20D, LF communications section 20E, RF communications section 20F and BLE communications section 20G are the same as in FIG. 2 described above and are not described here.

The ROM 20J memorizes various programs and various kinds of data. The ROM 20J according to the present exemplary embodiment memorizes the digital key database 120 relating to digital keys that is registered in advance.

The control ECU 20 implements BLE communications with the portable terminal 30 by executing a program memorized at the ROM 20J. For example, after locking the doors of the vehicle 12, the control ECU 20 transmits information of the locking and a lock trigger causing the locking of the doors to the portable terminal 30 by BLE communications. When the control ECU 20 acquires a digital key from the portable terminal 30, the control ECU 20 makes a determination as to whether the acquired digital key corresponds with the digital key database 120 registered in advance, and transmits the result of this determination to the portable terminal 30 by BLE communications.

Portable Terminal

Figure 9:
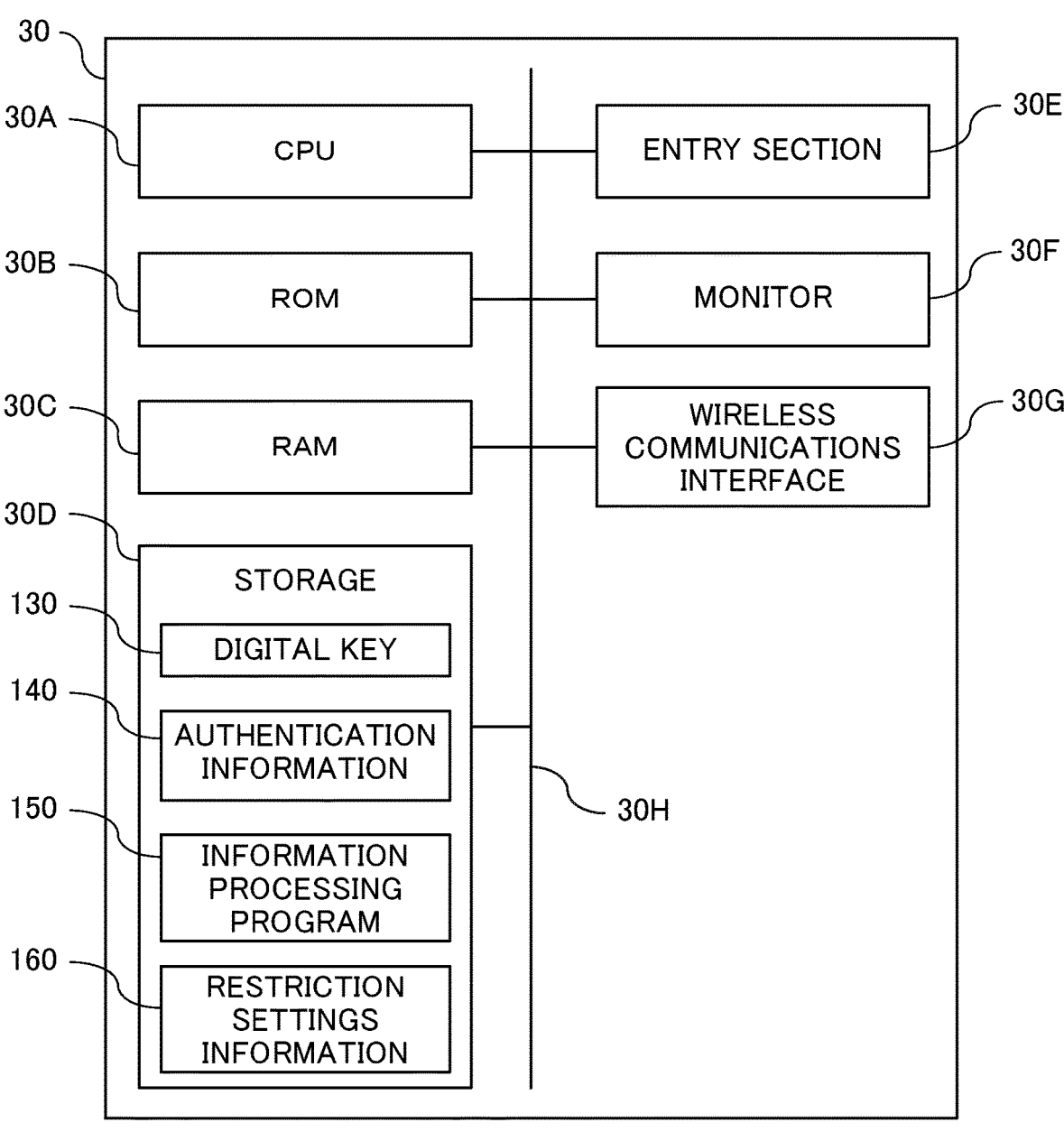
FIG. 9 is a block diagram showing hardware structures of a portable terminal according to the second exemplary embodiment.

As shown in FIG. 9, the portable terminal 30 according to the present exemplary embodiment includes the CPU 30A, the ROM 30B, the RAM 30C, storage 30I, the entry section 30E, the monitor 30F and the wireless communications interface 30G. The CPU 30A, ROM 30B, RAM 30C, entry section 30E, monitor 30F and wireless communications interface 30G are the same as in FIG. 6 described above and are not described here.

The storage 30I serves as the memory section, includes an HDD or SSD, and memorizes various programs and various kinds of data. The storage 30I according to the present exemplary embodiment memorizes the digital key 130, the authentication information 140, an information processing program 150 and restriction settings information 160. The ROM 30B may memorize the digital key 130, the authentication information 140, the information processing program 150 and the restriction settings information 160.

The information processing program 150 is a program for controlling the portable terminal 30. The restriction settings information 160 is information that specifies whether or not execution of a function from the portable terminal 30 is enabled when the doors of the vehicle 12 are locked and functions of the vehicle 12 are restricted. The restriction settings information 160 specifies that an execution command for a function from the portable terminal 30 is to be "enabled" or "disabled" for each of the functions and for each of the lock triggers.

Figure 10:
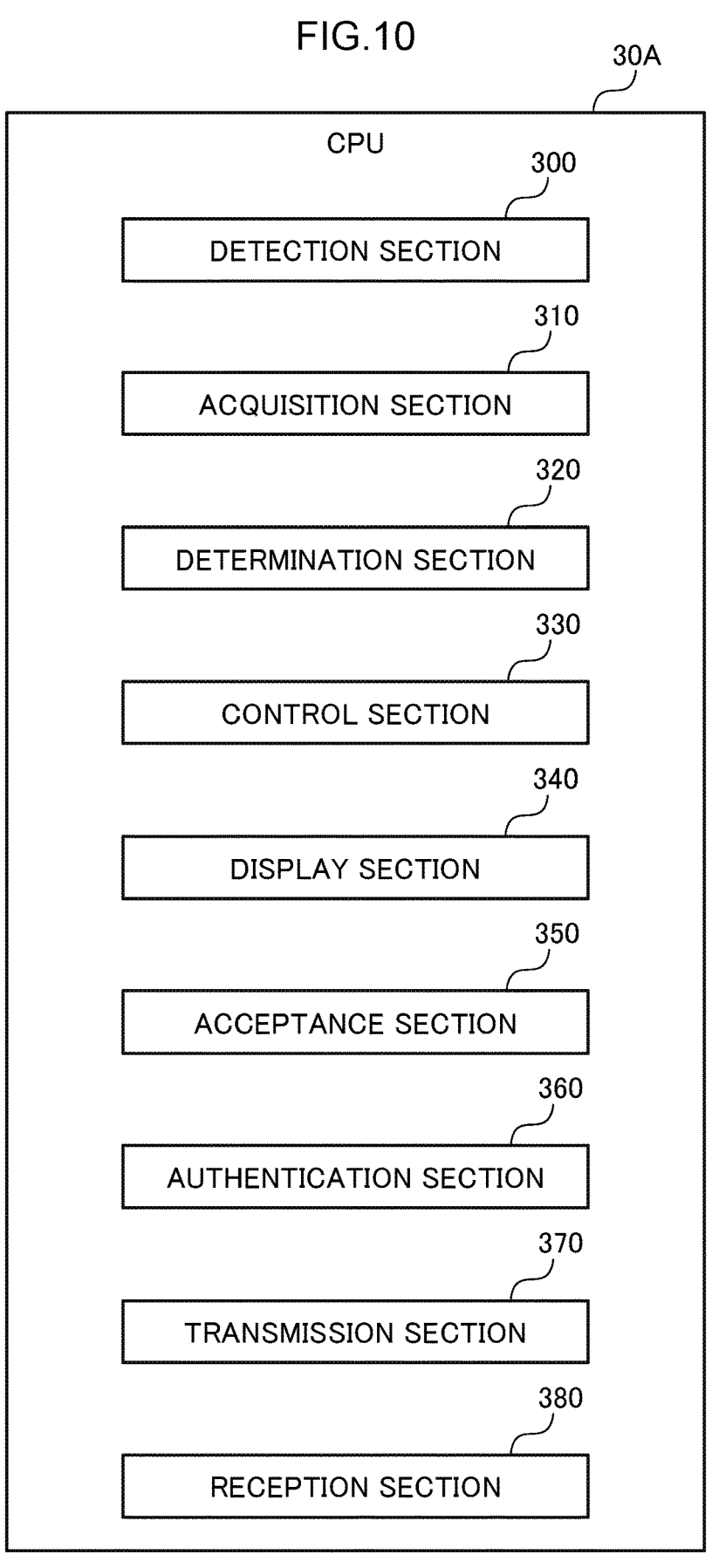
FIG. 10 is a block diagram showing functional structures of the portable terminal according to the second exemplary embodiment.

As shown in FIG. 10, in the portable terminal 30 according to the present exemplary embodiment, by executing the information processing program 150, the CPU 30 functions as a detection section 300, an acquisition section 310, a determination section 320, a control section 330, a display section 340, an acceptance section 350, an authentication section 360, a transmission section 370 and a reception section 380.

The detection section 300 detects whether the portable terminal 30 is located in the cabin of the vehicle 12. More specifically, when request signals for detection of the portable terminal 30 are received from the vehicle 12 using BLE communications, the detection section 300 of the portable terminal 30 detects that the portable terminal 30 is located in the cabin of the vehicle 12.

The acquisition section 310 uses BLE communications to acquire data from the vehicle 12. More specifically, the acquisition section 310 acquires information that the vehicle 12 is locked and a lock trigger causing the locking of the vehicle 12.

The determination section 320 makes a determination as to whether to implement a restriction of functions of the vehicle 12. More specifically, when the doors of the vehicle 12 are locked, the determination section 320 makes a determination as to whether the portable terminal 30 is located in the cabin of the vehicle 12. If the portable terminal 30 is located in the cabin, the determination section 320 determines to implement the restriction of the functions.

When a determination is made to implement a restriction of functions of the vehicle 12, the control section 330 implements the restriction of the functions of the vehicle 12.

The control section 330 applies the restriction of the functions in accordance with the lock trigger acquired by the acquisition section 310, based on the restriction settings information 160. The restriction settings information 160 is similar to the restriction settings information 110 described above and is not described here.

When the restriction of the functions is implemented, the display section 340 displays a message that the functions are restricted at the monitor 30F. The display of this message according to the present exemplary embodiment is an example of "notify a user that the functions are restricted".

The acceptance section 350 accepts input of authentication information of the owner of the vehicle 12 from the owner. The acceptance section 350 also accepts input of a specification for the restriction settings information from the owner of the vehicle 12 and modifies the restriction settings information.

The authentication section 360 makes a determination as to whether the authentication information accepted from the owner of the vehicle 12 corresponds with the authentication information 140 memorized in advance at the storage 30I, and authenticates the owner of the vehicle 12.

The transmission section 370 uses BLE communications to transmit data to the control ECU 20. More specifically, after the owner of the vehicle 12 is authenticated, the transmission section 370 transmits the digital key 130 memorized at the storage 30I to the control ECU 20.

The reception section 380 receives a digital key comparison result from the control ECU 20. When the comparison result is that the digital key transmitted by the transmission section 370 corresponds with the digital key database 120 memorized at the control ECU 20, the control section 330 removes the restriction of the functions.

Flow of Processing

Figure 11:
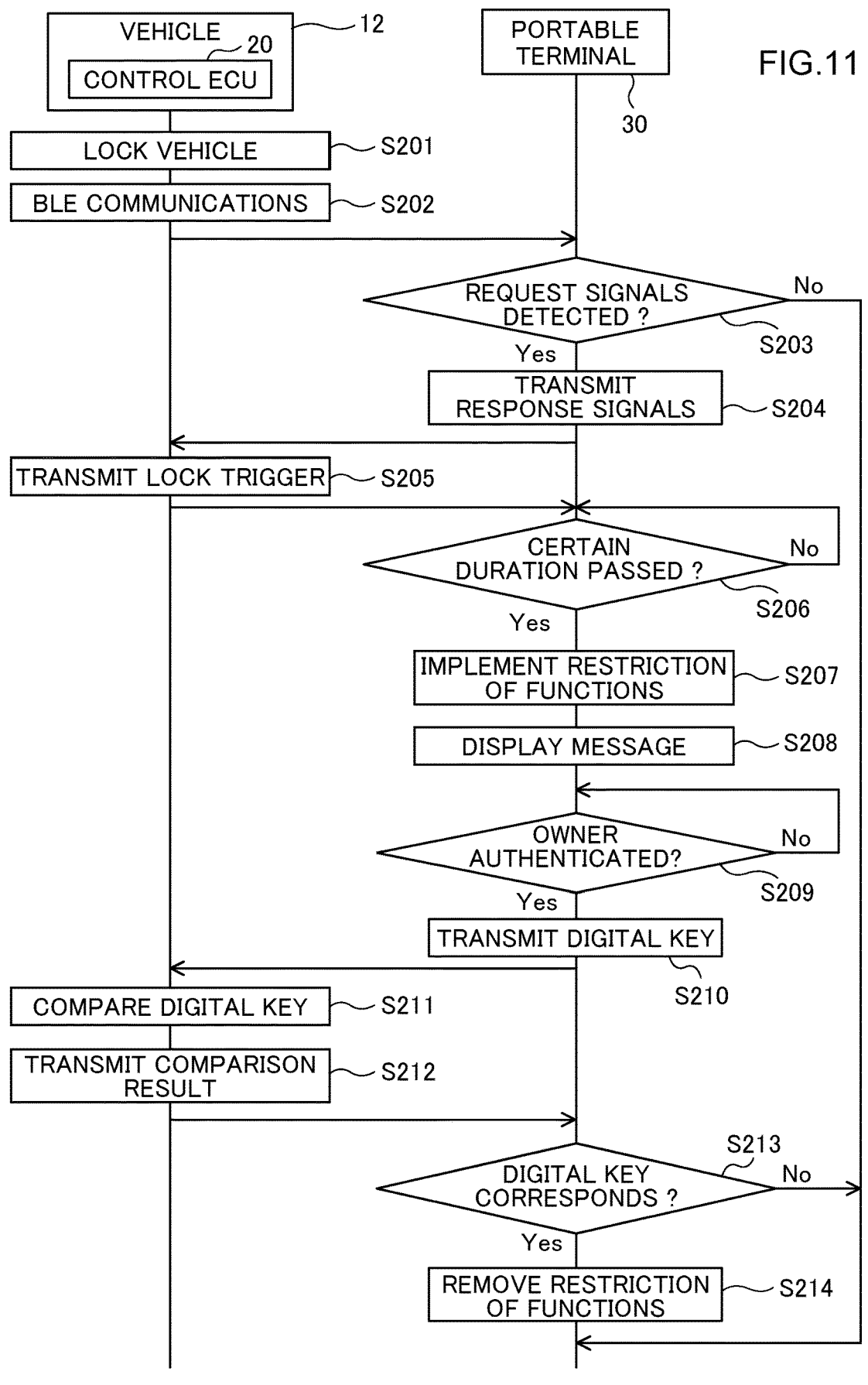
FIG. 11 is a sequence diagram showing flows of processing executed in the information processing system according to the second exemplary embodiment.

Now, a flow of processing of the information processing system 10 that is executed by the control ECU 20 and the portable terminal 30 in cooperation is described with reference to FIG. 11. FIG. 11 is a sequence diagram showing an example of flows of processing in the information processing system 10 according to the present exemplary embodiment. The information processing at the portable terminal 30 is realized by the CPU 30A executing the information processing program 150 and functioning as the detection section 300, the acquisition section 310, the determination section 320, the control section 330, the display section 340, the acceptance section 350, the authentication section 360, the transmission section 370 and the reception section 380.

As shown by the example in FIG. 11, the control ECU 20 locks the doors of the vehicle (step S201) and transmits request signals to the portable terminal 30 by BLE communications (step S202).

The portable terminal 30 makes a determination as to whether request signals from the control ECU 20 have been received (step S203). When the portable terminal 30 can detect the request signals from the control ECU 20 ("Yes" in step S203), the portable terminal 30 itself detects that the portable terminal 30 is located in the cabin of the vehicle 12, and transmits response signals to the control ECU 20 (step S204). Alternatively, when the portable terminal 30 cannot detect request signals from the control ECU 20 ("No" in step S203), the portable terminal 30 does not implement a restriction of the functions.

The control ECU 20 receives the response signals from the portable terminal 30 and transmits information that the vehicle 12 is locked and a lock trigger causing the locking of the vehicle 12 to the portable terminal 30 (step S205). The control ECU 20 also transmits the time of locking to the portable terminal 30.

After the portable terminal 30 receives the information that the doors of the vehicle 12 are locked, the lock trigger causing the locking of the vehicle 12 and the locking time, the portable terminal 30 makes a determination as to whether a certain duration has passed after the locking of the doors of the vehicle 12 (step S206). When the certain duration has passed after the locking of the doors ("Yes" in step S206), the portable terminal 30 implements a restriction of the functions (step S207). On the other hand, while the certain duration has not passed after the locking of the doors ("No" in step S206), the portable terminal 30 waits until the certain duration has passed.

After the certain duration has passed, the portable terminal 30 displays information that the restriction of the functions has been implemented at the monitor 30F (step S208). The portable terminal 30 accepts input of authentication information from the owner of the vehicle 12, and makes a determination as to whether the owner of the vehicle 12 is authenticated (step S209). When the portable terminal 30 accepts the authentication information from the owner of the vehicle 12 and the owner of the vehicle 12 is authenticated ("Yes" in step S209), the portable terminal 30 transmits information that the owner is authenticated to the control ECU 20 with the digital key 130 memorized at the storage 30D (step S210). On the other hand, while the portable terminal 30 has not accepted authentication information from the owner of the vehicle 12 and the owner is not authenticated ("No" in step S209), the portable terminal 30 waits until authentication information from the owner is accepted and the owner is authenticated.

The control ECU 20 receives the information that the owner of the vehicle 12 has been authenticated and the digital key from the portable terminal 30. The control ECU 20 compares the acquired digital key with the digital key database 120 registered in advance (step S211), and transmits a comparison result to the portable terminal 30 (step S212).

The portable terminal 30 receives the comparison result from the control ECU 20 and makes a determination as to whether the transmitted digital key 130 corresponds with the digital key database 120 memorized at the control ECU 20 (step S213). When the transmitted digital key 130 corresponds with the digital key database 120 memorized at the control ECU 20 ("Yes" in step S213), the portable terminal 30 removes the restriction of the functions (step S214). Alternatively, when the transmitted digital key 130 does not correspond with the digital key database 120 memorized at the control ECU 20 ("No" in step S213), the portable terminal 30 does not remove the restriction of the functions.

Summary of the Second Exemplary Embodiment

When the vehicle 12 is locked and the portable terminal 30 that functions as an electronic key is located in the vehicle, the portable terminal 30 according to the present exemplary embodiment restricts functions of the portable terminal 30 in accordance with a lock trigger causing the locking of the vehicle 12.

According to the present exemplary embodiment described above, the portable terminal 30 may be utilized to suppress use of the portable terminal 30 to perform control of the vehicle 12 that is not intended by the owner of the vehicle 12, even in a state in which the portable terminal 30 functioning as an electronic key is located inside the vehicle.

Remarks

In the exemplary embodiments described above, modes are described in which restrictions of functions are specified in the restriction settings information in accordance with whether a lock trigger causes locking in a state in which an owner is on board the vehicle 12 or not. However, this is not limiting. For example, restrictions of the functions may be specified in accordance with lock triggers such as manual locking by the owner, locking in response to an operation of the vehicle 12, locking as a function of the vehicle 12, locking caused by an operation of an external terminal, and so forth.

In the exemplary embodiments described above, modes are described in which authentication information of an owner of the vehicle 12 is registered in advance and the owner is authenticated. However, this is not limiting. Users of the vehicle 12 may be registered in advance and authenticated. When users are registered in advance, the vehicle 12 may be used by multiple people. When the vehicle 12 is used by multiple people, usability restrictions may be specified for each user or for each digital key 130 memorized at the portable terminal 30.

In the exemplary embodiments described above, the CPU 20A or CPU 30A reads and executes software (programs) but the various processes may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing described above may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiments described above, modes are described in which programs are memorized in advance (installed) on a computer readable non-transitory recording medium. For example, the information processing program 100 of the CPU 20A is memorized in advance at the ROM 20B, and the information processing program 150 of the CPU 30A is memorized in advance at the storage 30I. However, this is not limiting and a program may be provided in a mode of being recorded on a non-transitory recording medium such as a CD-ROM (compact disc read-only memory), DVD-ROM (digital versatile disc read-only memory), USB (universal serial bus) memory or the like. Modes are also possible in which a program is downloaded from external equipment via a network.

What is claimed is:

1. An information processing device mounted to a vehicle, the information processing device comprising at least one processor and memory that stores a restriction settings information relating to a specification of restrictions of functions, the restriction settings information being determined for each command for locking the vehicle, the at least one processor configured to:

control a plurality of functions of the vehicle based on an electronic key function, in accordance with a communication between a smartphone providing the electronic key function and the vehicle; and specify a restriction of a control using the electronic key function, among the plurality of functions of the vehicle, based on the restriction settings information, wherein the restriction settings information includes a specification that corresponds to a locking operation performed when a user boards the vehicle, or a locking operation performed when the user disembarks from the vehicle, and wherein contents of the restrictions in the restriction settings information are specified for each of lock triggers causing locking of a door of the vehicle and each of the plurality of functions of the vehicle.

2. The information processing device according to claim 1, wherein the at least one processor is configured to cause the smartphone to display the restriction settings information related to a subset of the functions restricted in accordance with one of the lock triggers.

3. The information processing device according to claim 1, wherein the at least one processor is configured to:

determine whether or not the smartphone is located in a cabin of the vehicle; and in a case in which the smartphone is determined to be located in the cabin of the vehicle, cause the smartphone to display the restriction settings information.

4. The information processing device according to claim 1, wherein the at least one processor is configured to control the plurality of functions of the vehicle based on an electronic key function, in accordance with a communication by Bluetooth between the smartphone and the vehicle.

5. The information processing device according to claim 3, wherein the at least one processor is configured to use a communication result between the smartphone and a communication device on board the vehicle to determine whether or not the smartphone is located in a cabin of the vehicle.

6. An information processing method comprising:

storing a restriction settings information relating to a specification of restrictions of functions, the restriction settings information being determined for each command for locking a vehicle;

controlling a plurality of functions of the vehicle based on an electronic key function, in accordance with a communication between a smartphone providing the electronic key function and the vehicle; and specifying a restriction of a control using the electronic key function, among the plurality of functions of the vehicle, based on the restriction settings information, wherein the restriction settings information includes a specification that corresponds to a locking operation performed when a user boards the vehicle, or a locking operation performed when the user disembarks from the vehicle, and wherein contents of the restrictions in the restriction settings information are specified for each of lock triggers causing locking of a door of the vehicle and each of the plurality of functions of the vehicle.

7. The information processing method according to claim 6, further comprising:

determining whether or not the smartphone is located in a cabin of the vehicle; and in a case in which the smartphone is determined to be located in the cabin of the vehicle, causing the smartphone to display the restriction settings information.

8. The information processing method according to claim 6, wherein the plurality of functions of the vehicle are controlled based on an electronic key function, in accordance with a communication by Bluetooth between the smartphone and the vehicle.

9. The information processing method according to claim 7, wherein a communication result between the smartphone and a communication device on board the vehicle is used to determine whether or not the smartphone is located in a cabin of the vehicle.

10. A non-transitory computer readable recording medium storing an information processing program executable by a computer to perform processing comprising:

storing a restriction settings information relating to a specification of restrictions of functions, the restriction settings information being determined for each command for locking a vehicle;

controlling a plurality of functions of the vehicle based on an electronic key function, in accordance with a communication between a smartphone providing the electronic key function and the vehicle; and specifying a restriction of a control using the electronic key function, among the plurality of functions of the vehicle, based on the restriction settings information, wherein the restriction settings information includes a specification that corresponds to a locking operation performed when a user boards the vehicle, or a locking operation performed when the user disembarks from the vehicle, and wherein contents of the restrictions in the restriction settings information are specified for each of lock triggers causing locking of a door of the vehicle and each of the plurality of functions of the vehicle.

11. The non-transitory computer readable recording medium according to claim 10, further comprising:

determining whether or not the smartphone is located in a cabin of the vehicle; and in a case in which the smartphone is determined to be located in the cabin of the vehicle, causing the smartphone to display the restriction settings information.

12. The non-transitory computer readable recording medium according to claim 10, wherein the plurality of functions of the vehicle are controlled based on an electronic key function, in accordance with a communication by Bluetooth between the smartphone and the vehicle.

13. The non-transitory computer readable recording medium according to claim 11, wherein a communication result between the smartphone and a communication device on board the vehicle is used to determine whether or not the smartphone is located in a cabin of the vehicle.

* * * * *